United States Patent [19]

Whiting et al.

[11] Patent Number: 5,235,183

[45] Date of Patent: Aug. 10, 1993

[54] OPTICAL SCANNER USING TILTED FILM MEDIA

[75] Inventors: Bruce R. Whiting, Rochester; Michael B. Brandt, Walworth, both of N.Y.

[73] Assignee: Eastman Kodak Company, Rochester, N.Y.

[21] Appl. No.: 871,521

[22] Filed: Apr. 21, 1992

[51] Int. Cl.⁵ .............................................. G02B 26/10
[52] U.S. Cl. ................................ 250/236; 356/444; 359/217
[58] Field of Search .................. 250/227.20, 227.24, 250/234–236; 356/444; 358/200; 359/205, 217, 218

[56] References Cited

U.S. PATENT DOCUMENTS

| | | | |
|---|---|---|---|
| 4,070,089 | 1/1978 | Grafton | 350/7 |
| 4,105,926 | 8/1978 | Reno et al. | 250/566 |
| 4,329,012 | 5/1982 | Minoura et al. | 359/218 |
| 4,491,875 | 1/1985 | Kawamura | 358/298 |
| 4,630,130 | 12/1986 | Parisi | 359/218 |
| 4,796,962 | 1/1989 | DeJager et al. | 359/217 |
| 4,818,861 | 4/1989 | Horiuchi et al. | 250/235 |
| 4,833,489 | 5/1989 | Byung-Sik | 359/218 |
| 4,908,511 | 3/1990 | Ishikawa et al. | 250/235 |
| 4,921,320 | 5/1990 | DeJager et al. | 359/205 |
| 4,930,869 | 6/1990 | Miyagawa et al. | 350/6.8 |
| 4,943,128 | 7/1990 | Takada et al. | 350/6.9 |
| 4,985,711 | 1/1991 | Nakamura et al. | 346/76 |

FOREIGN PATENT DOCUMENTS 63-136873 6/1988 Japan .
63-136874 6/1988 Japan .

Primary Examiner—David C. Nelms
Assistant Examiner—Stephone B. Allen
Attorney, Agent, or Firm—William F. Noval

[57] ABSTRACT

The method and apparatus for using a light beam to scan media, particularly radiographic film media, for digitization wherein the scanning beam and the media transport path are optimized to minimize interference of the incident directly transmitted scanning beam with light internally reflected back by the light exit surface of the media, which gives rise to significant modulation of the transmitted intensity and forms contour or fringe patterns which follow small variations in the media thickness. An optical light beam shaping system is employed to generate a generally elliptical or elongated cross-section light beam having a major and minor axis. A scanner deflects the light beam through a predetermined, flat scanning angle in a scan direction forming a scanning line on the incident surface of the film media. The film media is transported past the scanning light beam such that successive lines of the media are scanned. Preferably, the transport mechanism orients the film media at a tilted angle to the flat scanning angle of the deflected light beam to minimize the overlap of light reflected back at the light exit surface with incident light at all points of the deflected light beam through the flat scan angle. Preferably, the generally elongated light beam is rotated relative to the cross-scan direction of the film media to allow for the use of a relatively smaller tilt angle than would be necessary with circular or non-rotated generally elongated light beams.

12 Claims, 5 Drawing Sheets

OPTICAL SCANNER USING TILTED FILM MEDIA

FIELD OF THE INVENTION

The present invention relates to an optical scanner, and more particularly to an optical scanner which is particularly suitable for use in a laser scanning system for scanning radiographic images in film media.

BACKGROUND ART

Primary radiographic images are conventionally created by exposing a black and white photographic film or plate to an X-ray source and an interposed sample. The more absorbent parts of the sample throw shadows onto the photographic film or plate, and they appear less dark when the film or plate is developed. A radiograph of the human body, for example, shows the bones whiter than surrounding flesh because bones contain the element calcium, which has a relatively high atomic number. Abnormalities and foreign bodies are readily visible, and appropriate therapeutic action can be taken. Internal organs generally absorb X-rays to about the same extent as the surrounding flesh, but they can be shown up on a radiograph by concentrating material of greater absorbing power into the organ.

Radiography also has important industrial uses in locating internal defects in materials in creating three-dimensional images through stereoscopy, and in studying the three-dimensional structure of solids through tomography.

In all these applications, the exposed photographic film or plate is developed and employed diagnostically in medical applications and for quality control, record-keeping and scientific investigation in medical, industrial and scientific applications. Depending on the exposure radiation, the nature of the sample and the photo-chemistry of the photographic medium and its processing, results in a film radiograph that may possess a continuous tonal gradation in transmissivity to light extending between fully transparent (light) and fully opaque (black). The accurate reproduction of copies of the developed image is dependent on the ability of the techniques employed to faithfully reproduce the gray level gradation between the black and white extremes in the original continuous tone radiographic image.

Direct copying of the image has typically been attempted by photographic and xerographic techniques which rely upon exposure of a second photographic medium or xerographic drum to light transmitted through or reflected by the original image. Losses in tonal density and balance may occur, particularly in the xerographic reproduction process.

More recently, radiographic film images have been scanned by laser light beam scanners and photocell detectors to develop a digitized image field of the tonal density of the original image and to store the digitized image for transmission to remote locations and/or subsequent reproduction of the image. The digitization and storage of the image field also provides a back-up to the original film media which may be lost, particularly if it is sent to another location to be viewed by specialists in the field of interest.

The digital capture of diagnostic images from pre-existing radiographic film media typically employs laser light beam scanning systems of the type that are employed for either reading out or exposing or printing images. Scanning optical readers usually operate by detecting the light reflected from an illuminated spot on the incident surface of an opaque image bearing media. In the radiographic image context described above, where the image information is represented by the transmissivity of the media to light, the detector photo cell and optical system is arranged to detect the intensity of the light beam transmitted through the exit surface of the media rather than reflected by it. Such an optical scanner for reading out X-ray film images is disclosed in U.S. Pat. No. 4,818,861 where a laser beam light source is deflected through a predetermined generally flat scan angle in a scanning line across the radiographic image and the light transmitted by the radiographic image at each scanned point in each scanned line is collected and directed to a photodetector. These generally described scanner features are common to radiographic image scanning and image digitizing systems where the scanning beam is deflected across the nominal width of the radiographic image film media. Conventionally, the media is oriented in a plane perpendicular to the deflected light beam in both the scan and cross-scan directions at the center point of the scanning line. Thus, the light beam is deflected through the flat scan angle onto the incident surface of the media, and light transmitted through the media exits the exit surface and is collected by the collector optical system and presented to the photodetector as shown, for example, in the drawings of the '861 patent.

Typically, the constant intensity laser light beam is focused and deflected in the scan direction by optical systems of the type more specifically depicted in commonly assigned U.S. Pat. No. 4,921,320 to create a narrow band of light beam rays approximating a flat planar array to minimize the angulation of the light beam to the incident surface at the extreme end points of the scanning line.

The beam itself is typically circular in cross-section, although it has been proposed to employ an elliptical cross-section light beam having major and minor axis, through the use of suitably configured scanning deflectors, as taught, for example, in U.S. Pat. No. 4,943,128. The application of such circular or elliptical cross-section light beams to transparent image bearing media, such as radiographic film images, oriented perpendicularly to the scanning beam gives rise to the generation of interference of the directly transmitted incident light at the incident surface and the internally reflected light at the exiting surface of the media which appear as bands or contours at differing densities in the image, particularly as the media thickness varies. This effect is described in Section 7.5 of *Principles in Optics* by M. Born and E. Wolf, particularly FIG. 7.26. (In fact, this phenomena is used to interferometrically monitor the thickness of webs of manufactured film bases.) Such interference in the overlapping of the directly transmitted and the internally reflected light beams can give rise to significant modulation of transmitted intensity and introduces an image artifact causing a loss of accuracy in the read-out image.

Attempts have been made to reduce contouring and the overlap of incident directly transmitted scanning beams with light internally reflected back, especially at normal angles of incidence as reflected in the scanning systems proposed in Japanese Patent Laid-Open Numbers 63136-873A and 63136-874A. In one embodiment, it is suggested that the scanned medium be oriented at an angle other than 90° to the planar angle of the scanning beam that traverses the document.

SUMMARY OF THE INVENTION

It is therefore an object of the present invention to minimize the degree to which coherent interference of the internally reflected and the directly transmitted light beam forms contour or fringe patterns that mask or distort image density information and create artifacts and errors in the resulting digitized image field.

It is a further object of the present invention to accurately read out radiographic image transparencies to provide accurate digitized image fields of the information contained therein through the reduction or elimination of coherent interference which generate contour and fringe patterns which follow the small variations in the radiographic film image thickness.

It is a still further object of the present invention to provide a method and apparatus for digitizing light transmissive image bearing media without regard to variations in the thickness of the image bearing media.

These and other objects of the present invention are realized in a method and apparatus for reading out radiographic or other images on light transmissive image bearing media having a nominal thickness, opposed incident and exit surfaces, comprising the means for and method steps of generating a light beam having a generally elongated cross-section with major and minor axes; deflecting said elongated light beam through a predetermined scan angle in a scanning line on the incident surface of the media and in a scan direction generally aligned with the minor axis of the light beam; orienting the media at a non-normal angle to said deflected light beam through the predetermined scan angle such that the light beam internally reflected by the exit surface of the media does not substantially interfere with the directly transmitted incident light beam through the predetermined scan angle; and detecting the intensity of the light beam transmitted through the exit surface of the film media.

Preferably the media is tilted at a non-normal angle to the scanning line selected in relation to the nominal thickness for minimizing the overlap of light incident on the incident surface with light reflected by the exit surface of the media.

Moreover in a preferred embodiment, the generally elongated light beam is rotated about the axial direction of the beam to displace the minor cross-section axis away from the scanning line direction for presenting an elongated, rotated light beam deflected through said predetermined scan angle in the scan direction and onto the tilted film media sufficiently to prevent interference between the directly transmitted light beam incident on the incident surface of the media with the light beam internally reflected by the exit surface of the media back toward the incident surface.

The present invention thus relates to a light beam scanning system, and more particularly to a light beam scanning system for applying a rotated, elliptical cross-section light beam deflected by a reflecting mirror on an image bearing media to be scanned, where the image bearing media is itself tilted about the axis of the scan line so that interference occurring between the light reflected by the exit surface of the image bearing media with the directly transmitted incident light beam at any point in the scanning line is reduced to an acceptable level.

BRIEF DESCRIPTION OF THE DRAWINGS

The above and other objects, features and advantages of present invention will become more apparent in the following description when taken in conjunction with the accompanying drawings in which preferred embodiments of the present invention are shown by way of illustrated example and in which.

The drawings are not necessarily to scale.

DETAILED DESCRIPTION OF THE PREFERRED EMBODIMENTS

It is well known in image scanning reading and recording systems to apply light beam to scan an image bearing medium, such as a radiographic image to photoelectrically readout the recorded image information or thereby producing an image signal which may be digitized and stored or used to reproduce the image and other media. In such known image scanning reading/reproducing systems, the scanning light beam as emitted by a laser diode and deflected by a mirror light deflector which has reflecting facets that are rotatable or vibratable at high speed.

Figure 1:
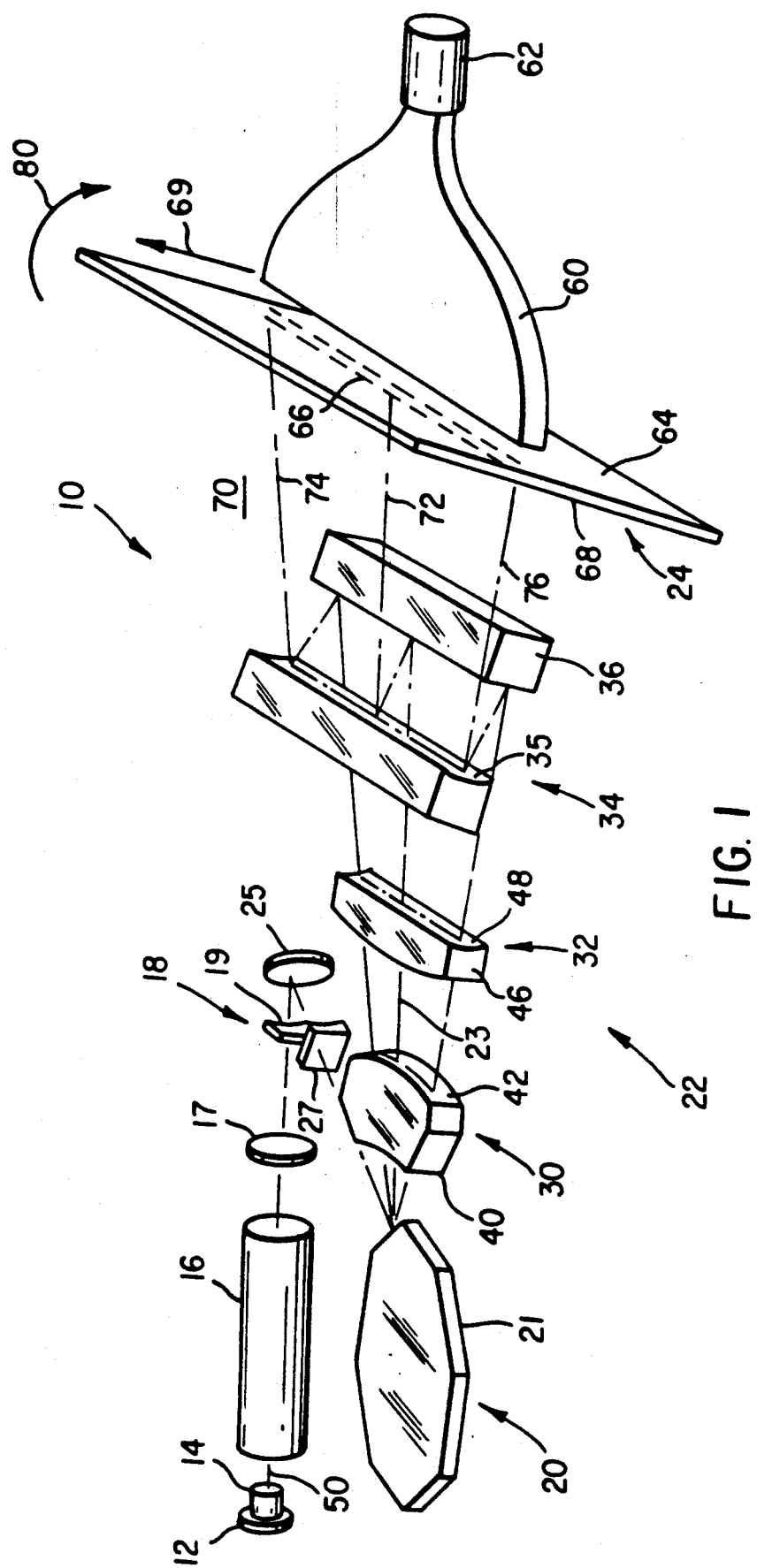
FIG. 1 depicts a perspective view of a prior art optical scanner for scanning a light transmissive image bearing media.

With reference to FIG. 1, it depicts an optical scanner 10 as shown and described in the above identified '320 patent (incorporated herein by reference). Scanner 10 comprises a diode laser 12 which serves as a light source, a collimator lens 14, a beam expander 16, a beam shaper system 18, a rotating polygon-shaped mirror 20, and an optical system 22 between the polygon-shaped mirror 20 and a receiving medium 24. Beam shaper system 18 includes a spherical lens 17, a positive cylinder lens 19, a negative cylinder lens 27, and a plano mirror 25 between lenses 19 and 27. The optical system 22 is disposed along an optical axis 23 and comprises two refracting scan lens elements 30 and 32 and a cylindrical mirror 34. Optical system 22 also includes a plano mirror 36 which isused between lens element 32 and mirror 34 to focus the light beam.

The lens element 30 is a thick meniscus lens element having two spherical surfaces 40 and 42. Surface 40 has a negative power and surface 42 has a positive power. The optical power of element 30 is very slightly positive. Lens element 32 has two cylindrical surfaces 46 and 48 which have the irrespective cylinder axes (not shown) oriented perpendicular to each other; both of the axes are also set perpendicular to the optical axis 23 which is defined by the first lens element 30. Surface 46 of lens element 32 has positive cylindrical power in the scan direction. Surface 48 of element 32 has negative cylindrical power in the cross-scan direction. Thus, the power of element 32 is positive in the scan direction and is negative in the cross-scan direction. The cylinder mirror 34 has a positive cylindrical power in the cross-scan direction, and the axis of the cylinder mirror is perpendicular to the optical axis 23.

Diode laser 12 is selected to produce a laser beam 50 of a predetermined wave length which is anamorphically shaped by the beam shaper system 18 before the beam is directed onto the facets 21 of polygon-shaped mirror 20. In the cross-scan direction, beam 50 comes to a waist focus in the near vicinity of a polygon facet 21. In the scan direction, beam 50 is converging towards a waist focus located at a predetermined distance, e.g., about 720 mm beyond the polygon-shaped mirror 20. Thus, in the scan direction, the incident beam at the mirror facet 21 is not collimated but has a positive vergence. Beam 50, after reflection at the facet 21 and after having passed through the two lens elements 30 and 32, is reflected again at the cylinder mirror 34 and comes to a waist focus at, or in the near vicinity of, the receiving medium 24. In the scan direction, the waist focus stays within ±0.13 mm from the receiving medium over a total line length exceeding 13 inches. As a result, the computed beam radius which is nominally about 0.012 mm to the exp (−2) power points, varies less than 5% in size in the scan direction. In the cross-scan direction, the waist focus stays within ±0.35 mm from the receiving medium 24, and the beam radius, nominally about 0.015 mm, varies by less than 10% in this cross-scan direction. These properties of the laser beam 50 at the receiving medium 24 make it suitable to perform exceptionally high-resolution scanning.

The resolution obtained with optical scanner 10 is such that it can be used in creating exceptional quality continuous tone or half-tone images, the latter as would be formed, for example, by using a screen (not shown) having 150 dots per inch. The size of these equally spaced dots determines the apparent gray level of the image in any small region. Each dot could consist of a square 12 by 12 array of minipixels; in effect we would have eighteen hundred minipixels per inch, in both scan and cross-scan directions. By controlling the power level of the laser beam 50 as it writes each line, these minipixels are switched on and off, thereby altering the apparent size of each dot. The laser beam spot sizes, provided by the present invention are consistent with its use for this purpose.

The remaining features of the system depicted in FIG. 1 are described in the '320 patent in detail. FIG. 1 differs from the system depicted in the '320 patent in that the image scanned constitutes a planar image bearing media 24 instead of a receiving media, and the system is employed for scanning rather than recording information. Furthermore, FIG. 1 illustrates the placement of a light collector 60 and photocell 62 adjacent the exit surface 64 of the sheet of radiographic film media 24. The photocell 62 thus detects the light transmitted through the sheet media 24 and develops an electrical signal representative of the intensity of the transmitted, image modulated scanning light beam as is well known in the prior art.

The scanning beam thus sweeps back and forth with the rotation of the mirror 20 to successively position the beam in a scan line 66 on the incident surface 68 of the media 24. Successive scan lines 66 are effected by movement of the media 24 in the direction signified by the arrow 69. The transport mechanism employed may preferably include pinch rollers (not shown) for gripping the surfaces 64 and 68 of the media 24 and advancing it in the direction of arrow 69 in a step-wise fashion as is well known in the art. Further mechanisms may be employed to stabilize the sheet 24 and maintain its accurate transport past the scanner 10 and light collector 60 and photocell 62.

In the system depicted in FIG. 1, the sheet media 24 is transported by the transport mechanism at an angle of about 90° in the cross-scan direction to the incident light beam 70° as it is scanned in the scan line 66. In accordance with the present invention, it is proposed to tilt the scanned media 24 in the direction indicated by the arrow 80 and to employ a beam shaping and rotating optical system in the beam shaper system 18 to minimize or eliminate the interfering overlap of the incident light beam with reflected light from the exit surface 64, which overlap is particularly evident at the central scan beam position 72, as described hereinafter.

Figure 2:
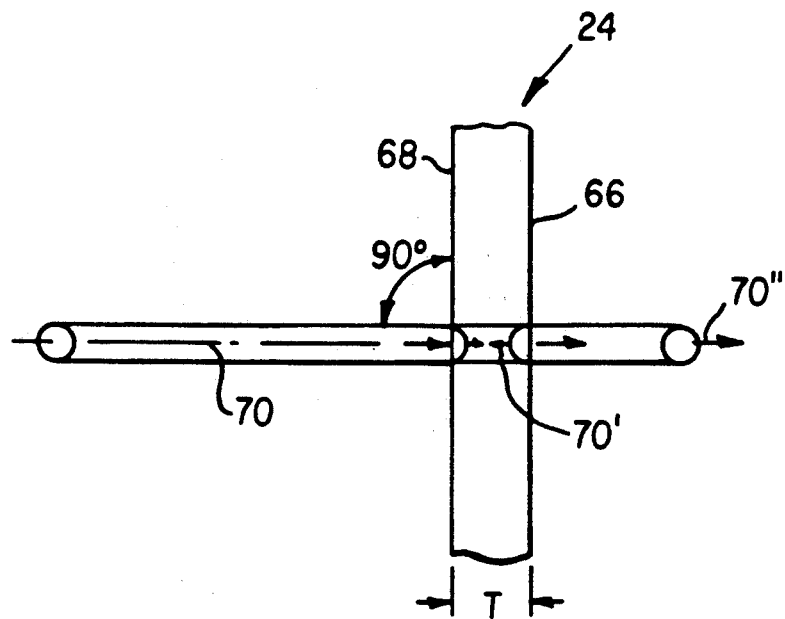
FIGS. 2 & 3 illustrate the effect of tilting the angle of incidence of the incident light beam from the 90° angle depicted in FIG. 1 to an angle of about 45° in further illustration of the principle of the invention.
Figure 3:
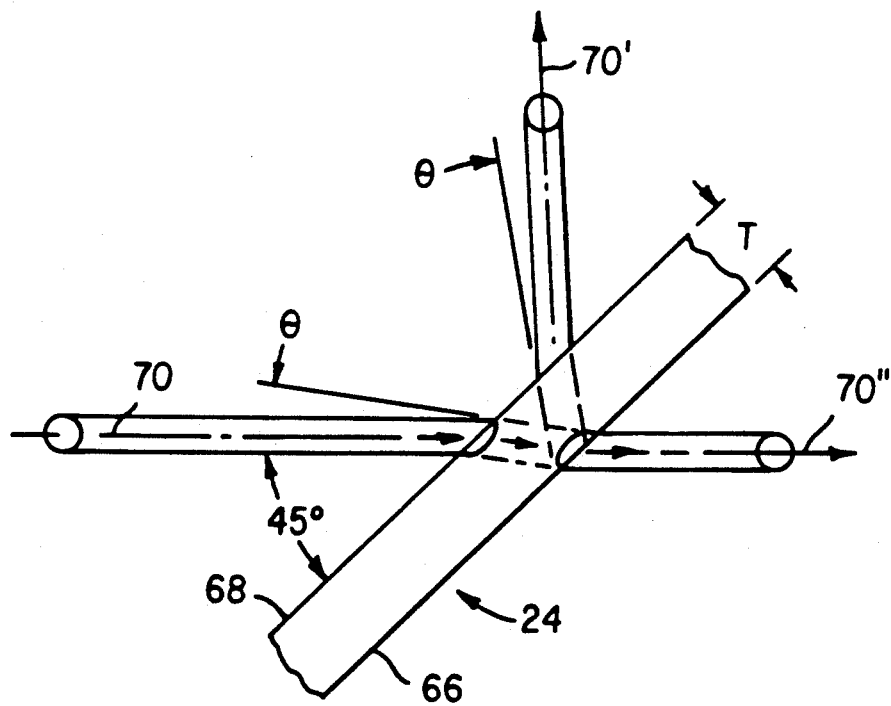

Turning now to FIGS. 2a and 3, they illustrate (an exaggerated fashion and not to scale) the effect of tilting the image bearing film media 24 from a normal angle of the incidence of the incident light 70 to a highly exaggerated 45° in order to divert the reflected light beam 70' and reduce its attenuating affect on the transmitted light beam 70''.

In FIG. 2, the light beam is illustrated as a spherical cross-section beam 70 passing through the incident surface 68 of the media 24 and exiting the exit surface as exit beam 70''. Exit beam 70'' is attenuated by the degree of transmissivity or opacity of the image information that it passes through within the thickness T of the media 24. A portion of the incident light beam 70 that strikes the exit surface 66 is reflected back on to itself and is denoted as the reflected beam 70. Ordinarily, if the thickness T remains constant across the scan direction and/or in the cross scan direction, then the relative phase between the directly transmitted light beam and the internally reflected light beam remains constant, and the intensity of the transmitted energy, resulting from the interference of the coherently combined beam components remains constant. However, if the thickness T varies across the scan direction and/or in the cross-scan direction, then the intensity of the transmitted energy, resulting from the interference of the coherently combined beam components will vary. The digitized signal will thus contain contour effects, fringing or ghosting patterns of a type described in Section 7.5 of *Principles in Optics* by M. Born and E. Wolf, particularly FIG. 7.26.

The degree to which the internally reflected beam 70' interferes with the incident directly transmitted beam 70 also depends on the angular orientation of the incident beam in the scan line direction on the incident surface 68 and the reflective surface 66. As shown in FIG. 2, at the normal angle of incidence (90°) the internally reflected light beam 70' reflects directly back on the incident light beam 70, thus evenly attenuating the transmitted light beam 70''.

Figure 4:
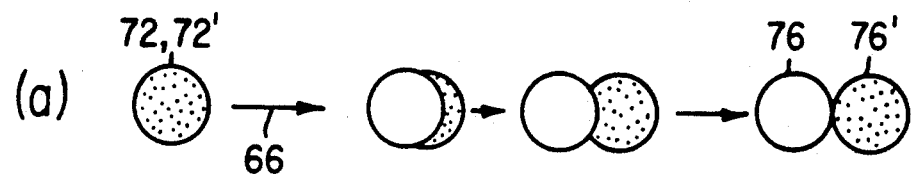
FIGS. 4a & 4b are illustrations of scanning line interference patterns of circular and elongated cross-section incident and reflected light beams at predetermined points in a scanning line.
Figure 4:
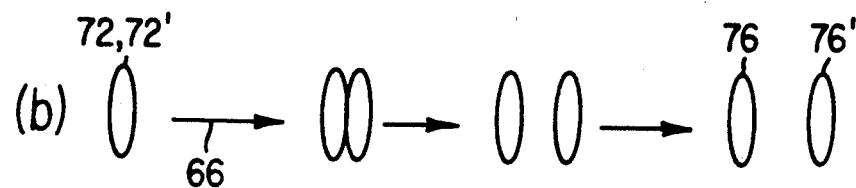

Referring now to FIG. 4a. it illustrates the superposition or overlapping of the incident directly transmitted and the internally reflected light beams at positions 72, 72' and 76, 76' as well as intermediate positions in the half scan line from position 72 to 76 and FIG. 1. The directly transmitted light beam is depicted as a transparent sphere and the internally reflected light beam is depicted as a semi-opaque sphere. At the left, the directly transmitted and internally reflected light beams 72, 72' totally overlap. As the beam is deflected along the scan line 66 from the central scan point 72 toward either extreme 74, 76, the overlap of the directly transmitted and internally reflected light beam progressively decreases.

FIG. 4b illustrates the effect of modifying the shape of the incident light beam from the circular cross-section of FIG. 4a and FIGS. 2 and 3 to an elliptical shape having a major and minor cross-section axes (through the use of suitable masks and optical components of the beam shaper system 18 of the scanner 10) in order to decrease the amount of overlap that occurs from the center beam position 72 to the extreme positions 74, 76. FIG. 4b thus illustrates the effect of changing the shape of the beam in reducing overlap of normally incident scanning beams in relation to FIG. 4a. However, with normal orientation, the directly transmitted beam and the internally reflected beam still overlap entirely at the center beam position 72.

Figure 5:
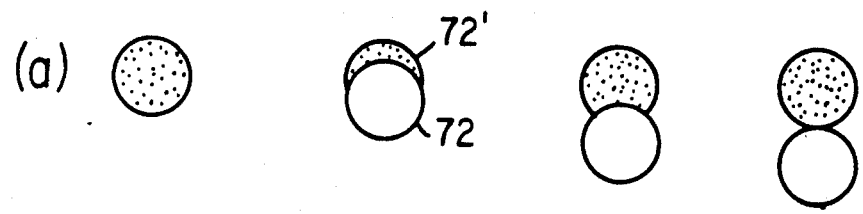
FIGS. 5a & 5b illustrate the effect of tilting the film media away from normal to effect displacement of circular cross-section and elongated cross-section incident and reflected light beams.
Figure 5:
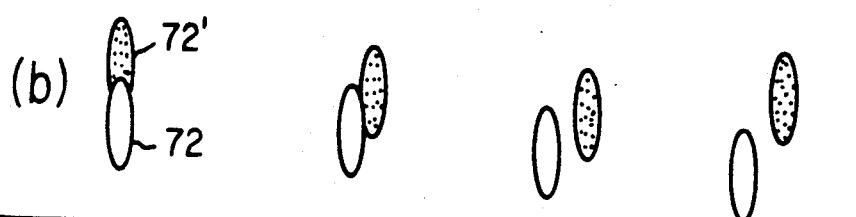

Turning to FIGS. 5a and 5b, they illustrate the affect of tilting the sheet film media 24 in the direction of arrow 80 on the directly transmitted and the internally reflected beams at the centrally disposed position overlap of the 72, 72' at various degrees of tilt with a circular cross-section beam (FIG. 5a) and an elliptical cross-section beam (FIG. 5b).

As shown in FIG. 5a, the progressive tilting of the plane of the film media 24 in relation to the array of incident light beams 70 may result in elimination of the overlap of the directly transmitted and the internally reflected light beams at position 72, 72'. However, tilting of the plane of the film media 24 sufficiently to minimize overlap of the directly transmitted and the internally reflected beams at position 72, 72' may introduce other errors that become progressively more deleterious approaching the extreme scanning beam positions 74 and 76 at the respective ends of the scan line 66. As the exiting light from surface 66 becomes more displaced in the scan direction from the incident light on surface 68, it becomes less capable of accurately scanning the image information.

This phenomenon is illustrated in FIG. 3 where the media 24 has been tilted to 45 degrees of normal, resulting in a displacement of the exit internally reflected light beams 70" in the cross-scan direction 69. Advantageously, the internally reflected beam 70' is reflected entirely away from the directly transmitted light beam 70. It will be appreciated that this displacement may not be severe for scanning purposes depending on the thickness T and the cross-section area of the scanning beam 70, particularly at the center beam position 72. However, at the extreme beam positions 74 and 76, the exit internally reflected beam displacement is not only in the cross-scan direction, but also in the scan direction, and thus the actual resolution of scanning may be impaired. The degree of impairment depends on the resolution of the scanning beam, the thickness of the media 24, the width of the scan line 66 and the degree of divergence of the scanning beams in the beam positions 74 and 76 with respect to the center beam position 72. It will be appreciated that these dislocation effects place a practical limit on the degree of angular tilting of the film media 24 that may be employed in any given scanner optical system.

FIG. 5b illustrates the effect of employing an elongated or elliptical light beam and scanning that elongated beam on a slightly tilted film media 24 in several positions between the center beam position 72 toward the extreme beam positions 74 and 76. The area of reflectance overlap is greatly diminished by comparison of the relative positions of FIG. 5b to those of FIG. 4b. Thus, in the first embodiment of the present invention it is contemplated that an elongated on elliptical scanning beam be employed in conjunction with a slightly tilted scanning plane to reduce the reflectance overlap to a small portion of the line of scan 66 in the immediate vicinity of the center beam position 72.

Figure 6:
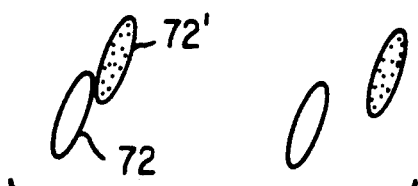
FIG. 6 illustrates the effect of rotating the elongated scanning light beam of FIG. 4B relative to the scan direction to eliminate or diminish interference between the incident directly transmitted and internally reflected light beam a tall points of incidence in the scan line.

In a further embodiment of the present invention is contemplated that the overlap of the elongated or elliptical directly transmitted and internally reflected light beams illustrated in FIG. 5b may be substantially reduced by rotating the cross-section axes of the incident elliptical or elongated scanning beam at an angle of about 30 to 45 degrees, so that the internally reflected light beam from the tilted exit surface 64 at the center beam position 72 does not overlap with the directly transmitted scanning beam. In this embodiment it will be understood that the beam shaper system 18 includes optical components for effecting the rotation of the scanning beam as illustrated in FIG. 6.

Turning finally to FIGS. 7-11, they illustrate in graphic form the degree of overlap of the incident directly transmitted beam with light internally reflected for certain of the situations described in reference to the illustrations of FIGS. 4a, 4b, 5b and 6.

Figure 7:
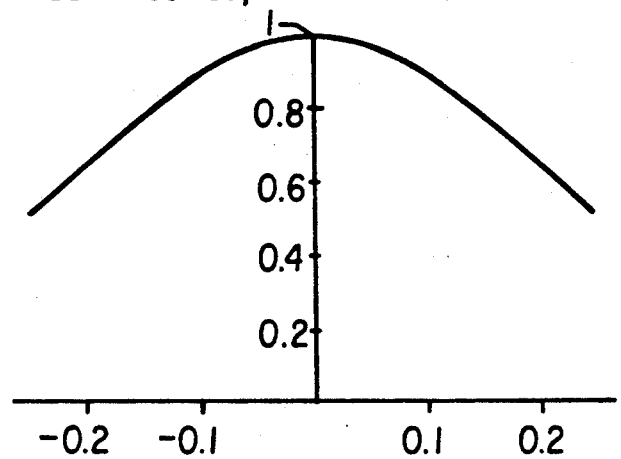
FIGS. 7-11 are data plots depicting the magnitude of interference with respect to the scan angle for certain of the relationships illustrated in FIGS. 4a, 4b, 5b and 6.
Figure 8:
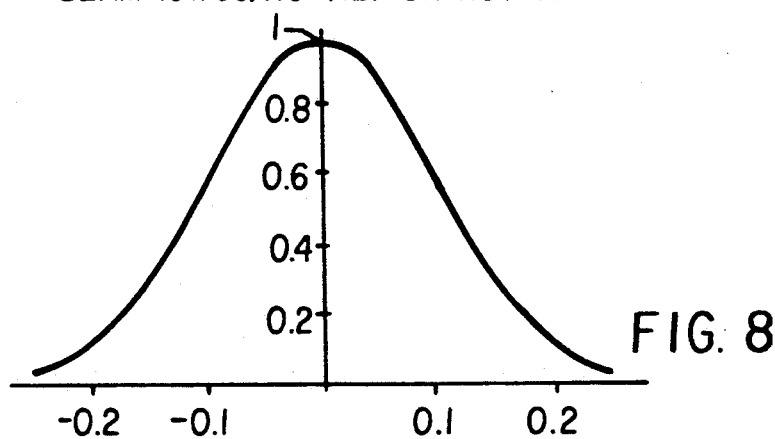
Figure 9:
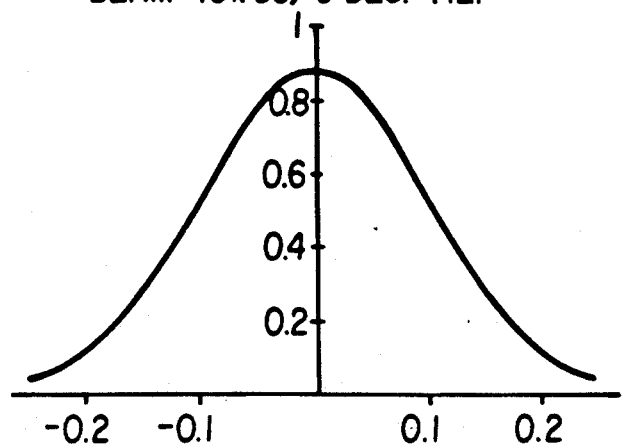
Figure 10:
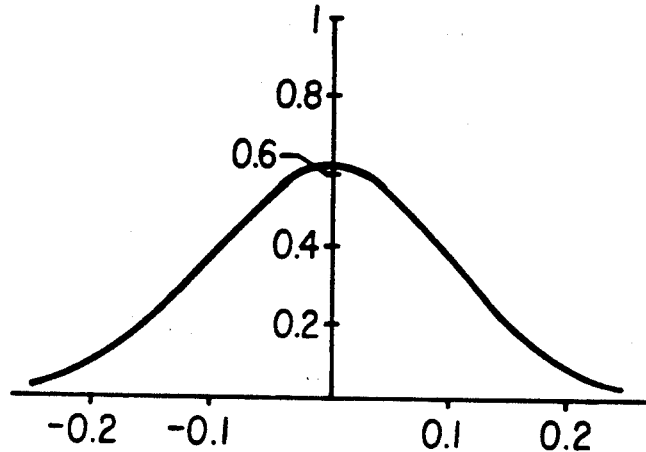
Figure 11:
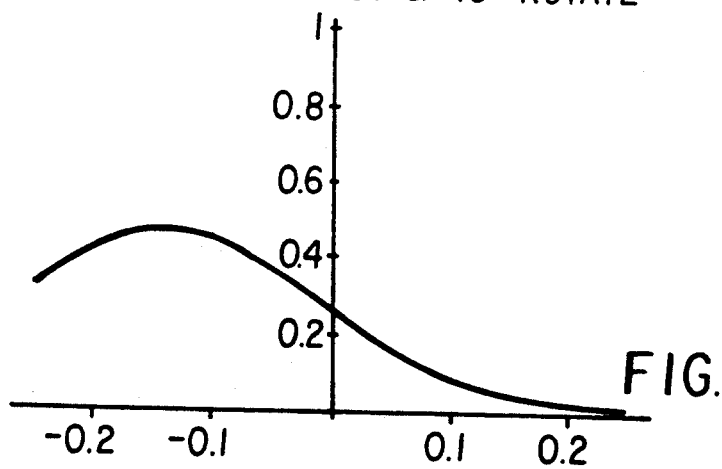

In FIGS. 7-11, the Y-axis is the magnitude of the interference effect, normalized to about 8% intensity modulation. The X-axis is the scan angle in radians, with a full scan being about $+/-7-10°$. In FIG. 7, for a symmetric beam there is maximum interference and it falls off slowly with scan angle. In FIG. 8, an asymmetric beam (narrow in fast scan direction as shown in FIG. 4b) falls off more rapidly. In FIGS. 9 and 10, an asymmetric beam on a tilted film plane reduces the interference magnitude. By rotating the beam onto the tilted film, the interference is further diminished, as shown in FIG. 11. It has been found that to suppress visibility of the artifact, it is necessary to decrease the interference terms by about a factor of 4 times, which is best realized in comparing the plot of FIG. 11 to FIGS. 7-10.

Although only a single currently preferred optical scanner system 10, as shown in FIG. 1, has been illustrated it will be understood that any conventional scanner system may be employed in conjunction with the principles of the present invention to eliminate reflected beam interference in both transmissive or reflectance based scanning systems where such reflectance interference is prone to occur.

The invention has been described in detail with particular reference to preferred embodiments thereof, but it will be understood that variations and modifications can be effected within the spirit and scope of the invention.

What is claimed is:

1. Apparatus for reading out image density information recorded in a transparent film media having a predetermined nominal thickness and opposed incident and exit surfaces comprising:

means for generating a light beam having a generally elongated cross-section with major and minor axes;

deflector means for deflecting said elongated light beam through a predetermined scan angle in a scanning line on the incident surface of the media and in a scan direction generally aligned with the minor axis of the light beam;

means for orienting the media at a non-normal angle to said deflected light beam through the predetermined scan angle such that the light beam reflected by the exit surface of the media does not substantially interfere with the incident directly transmitted light beam through the predetermined scan angle; and means for detecting the intensity of the light beam transmitted through the exit surface of the film media.

2. The apparatus of claim 1 wherein said orienting means further comprises:

means for orienting the media at a non-normal angle selected in relation to said predetermined thickness for minimizing the interference of light incident on the incident surface from interfering with light reflected by the exit surface of the media.

3. The apparatus of claim 2 wherein said orienting means further comprises:

means for tilting the media in the general direction of the major axis of the elongated light beam.

4. The apparatus of claim 3 further comprising:

optical means for rotating the generally elongated light beam about the axial direction of the beam to displace the minor cross-section axis away from the scanning line direction for presenting an elongated, rotated light beam deflected by said deflector means through said predetermined scan angle in the scan direction and onto the tilted film media sufficiently to prevent interference between the light beam incident on the incident surface of the media with the light beam reflected by the exit surface of the media back toward the incident surface 5. A method of reading out image density information recorded in a transparent film media having a predetermined nominal thickness and opposed incident and exit surfaces comprising the steps of:

generating a light beam having a generally elongated cross-section with major and minor axes;

deflecting said elongated light beam through a predetermined scan angle in a scanning line on the incident surface of the media and in a scan direction generally aligned with the minor axis of the light beam;

orienting the media at a non-normal angle to said deflected light beam through the predetermined scan angle such that the light beam reflected by the exit surface of the media does not substantially interfere with the incident directly transmitted light beam through the predetermined scan angle; and detecting the intensity of the light beam transmitted through the exit surface of the film media.

6. The method of claim 5 wherein said orienting steps further comprises:

orienting the media at a non-normal angle selected in relation to said predetermined thickness for minimizing the interference of light incident on the incident surface from interfering with light reflected by the exit surface of the media.

7. The method of claim 6 wherein said orienting steps further comprises:

tilting the media in the general direction of the major axis of the elongated light beam.

8. The method of claim 7 further comprising the step of:

rotating the generally elongated light beam about the axial direction of the beam to displace the minor cross-section axis away from the scanning line direction for presenting an elongated, rotated light beam deflected by said deflector means through said predetermined scan angle in the scan direction and onto the tilted film media sufficiently to prevent interference between the light beam incident on the incident surface of the media with the light beam reflected by the exit surface of the media back toward the incident surface.

9. Apparatus for reading out image density information recorded in a transparent film media having a predetermined nominal thickness and opposed incident and exit surfaces comprising:

means for generating a light beam having a generally elongated cross-section with major and minor axes;

deflector means for deflecting said elongated light beam through a predetermined scan angle in a scanning line on the incident surface of the media and in a scan direction generally aligned with the minor axis of the light beam;

optical means for rotating the generally elongated light beam about the axial direction of the beam to displace the minor cross-section axis away from the scanning line direction for presenting an elongated, rotated light beam deflected by said deflector means through said predetermined scan angle in the scan direction and onto the film media sufficiently to prevent interference between the light beam incident on the incident surface of the media with the light beam reflected by the exit surface of the media back toward the incident surface; and means for detecting the intensity of the light beam transmitted through the exit surface of the film media.

10. The apparatus of claim 9 further comprising:

means for orienting the media at a non-normal angle selected in relation to said predetermined thickness for minimizing the interference of light incident on the incident surface from interfering with light reflected by the exit surface of the media 11. A method of reading out image density information recorded in a transparent film media having a predetermined nominal thickness and opposed incident and exit surfaces comprising the generating a light beam having a generally elongated cross-section with major and minor axes;

deflecting said elongated light beam through a predetermined scan angle in a scanning line on the incident surface of the media and in a scan direction generally aligned with the minor axis of the light beam;

rotating the generally elongated light beam about the axial direction of the beam to displace the minor cross-section axis away from the scanning line direction for presenting an elongated, rotated light beam deflected by said deflector means through said predetermined scan angle in the scan direction and onto the film media sufficiently to prevent interference between the light beam incident on the incident surface of the media with the light beam reflected by the exit surface of the media back toward the incident surface; and detecting the intensity of the light beam transmitted through the exit surface of the film media.

12. The method of claim 11 further comprising the step of:

orienting the media at a non-normal angle selected in relation to said predetermined thickness for minimizing the interference of light incident on the incident surface from interfering with light reflected by the exit surface of the media.

* * * * *